Patented Feb. 18, 1936

2,031,268

UNITED STATES PATENT OFFICE 2,031,268

MANUFACTURE OF NEW STABLE ANTIMONY COMPOUNDS

Walter Kussmaul, Basel, Switzerland, assignor to the firm of Chemical Works Formerly Sandoz, Basel, Switzerland No Drawing. Application June 26, 1931, Serial No. 547,175. In Germany July 8, 1930

6 Claims. (Cl. 260—11)

In the U. S. Patent application Ser. No. 408,936, filed November 21, 1929, a process is described, according to which stable, water soluble alkali metal salts of the antimonyl polyhydroxycarboxylic acids can be prepared.

It has now been found that the alkali metals contained in such compounds can be replaced by polyvalent metals. The invention consists, therefore, in dissolving antimony oxyhydrates in aqueous solutions of polyvalent metal salts of polyhydroxymonocarboxylic acids deriving from aldoses. According to this invention, for example heavy metal salts of gluconic acid can be dissolved in water and treated with antimony oxyhydrates. The formation of the antimonyl compounds occurs rapidly, especially when the solutions are heated. The new compounds thus prepared may be isolated from their solutions in the usual way.

Compounds containing antimony and heavy metals are known in form of antimonites and antimoniates. But such compounds cannot be used for therapeutical purposes, especially for injection, because they possess a very small solubility.

The metal compounds of the antimonylpolyhydroxymonocarboxylic acids, prepared according to the present process are mostly crystallized compounds, which can easily be recrystallized from the solutions of the respective metal salts of the polyhydroxymonocarboxylic acids. Owing to the metal linked they are more or less easily soluble salts, yielding in general stable aqueous solutions, which may be used for injections. By treating their aqueous solutions with hydrogen sulphide a precipitation of antimony sulphide occurs. The stability of the solutions may further be increased by an addition thereto of salts of gluconic acid. Supersaturated stable solutions of these compounds may be prepared by heating their hot concentrated solutions in a closed vessel.

The new salts are probably complex compounds, containing the metal and the crystal water linked in complex manner to the antimonyl polyhydroxycarboxylic acid rest. This assumption is based on the fact that for example in the case of copper antimonyl gluconate the blue color of the complex compound disappears on addition of a small quantity of sulphuric acid, or like in the case of calciumantimonyl gluconate, that by drying in vacuo over phosphorous pentoxide it splits off two molecules of water.

The compounds prepared according to the present process, illustrated by the following examples, the parts being by weight, may be used for technical and therapeutical purposes.

Example 1

20 parts of calcium gluconate are dissolved in 80 parts of boiling water and treated with 20 parts of dry antimony trihydroxide. The milky solution thus obtained is boiled for about 15 minutes, filtered and allowed to crystallize. From the solution are obtained 20 parts of a colorless crystalline powder, containing 32.47% of Sb and 5.41% of Ca. The theoretical content for the formula:

$4(C_6H_{10}O_7SbO)_2 Ca + 2H_2O$, mol. weight 739.87, would be of 32.93% of Sb and 5.41% of Ca.

The calcium antimonyl gluconate thus prepared is rather difficulty soluble in cold water. When dissolved in aqueous solutions of sodium gluconate a solution of an excellent stability is obtained.

Its probable constitution is the following:

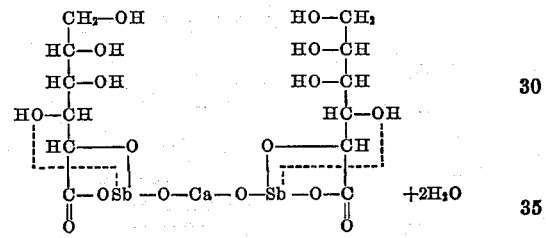

Example 2

10 parts of calcium glucinate are dissolved in 150 parts of boiling water and treated with 9.5 parts of antimony oxyhydrate prepared from antimony pentachloride by treating it with water. The solution obtained is then boiled for a certain time, filtered, strongly concentrated in vacuo and the product obtained precipitated from its solution by means of methyl alcohol. The yield is about 9 parts of calciumantimonyl gluconate containing pentavalent antimony. The salt is easily soluble in water and contains 31.8% of Sb and 5.8% of Ca. The theoretical content for the formula $(C_6H_{10}O_9Sb)_2$ Ca would be of 33.1% of Sb and 5.4% of Ca.

Its probable constitution is the following:

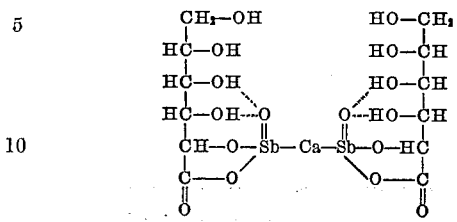

Example 3

20 parts of magnesium gluconate are dissolved in 40 parts of hot water and saturated with antimony oxyhydrate. After a certain time, the solution is separated from the excess of antimony oxyhydrate, for instance by filtration or centrifugation, and then treated with methylalcohol; 22 parts of magnesium antimonyl gluconate are thus obtained. The product is easily soluble in water and contains 30.0% of Sb. The theoretical content for the formula $(C_6H_{10}O_7SbO)_2$ Mg+$2H_2O$ would be of 33.6% of Sb.

Its probable constitution is the following:

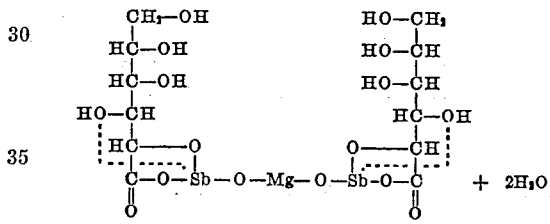

Example 4

45 parts of copper gluconate are dissolved in 100 cc. of hot water and treated with 22 parts of dry antimony oxyhydrate. The solution obtained is then heated on a steam bath during half an hour, filtered from the undissolved parts and the filtrate treated with methyl alcohol, whereby 45.9 parts of a light blue powder are precipitated. The copper antimonyl gluconate thus obtained is easily soluble in water and contains 33.6% of Sb and 8.7% of Cu. The theoretical content for the formula $(C_6H_{10}O_7SbO)_2$ Cu+$2H_2O$ would be of 31.9% of Sb and 8.3% of Ca.

Its probable constitution is the following:

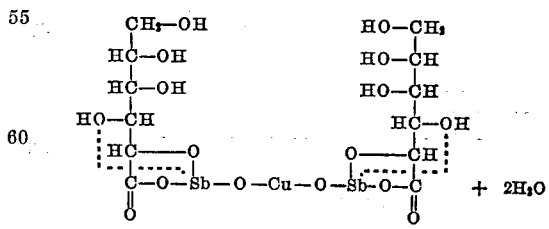

Example 5

10 parts of nickel gluconate, dissolved in 20 parts of water are treated in the cold during two days with 10 parts of antimony oxyhydrate. After filtration the new compound is precipitated by means of methylalcohol, in form of a light green powder, easily soluble in water and containing 34.5% of Sb and 6.2% of N. The theoretical content for the formula $(C_6H_{10}O_7SbO)_2$ Ni+$2H_2O$ would be of 32.1% of Sb and 7.7% of Ni.

Its probable constitution is the following:

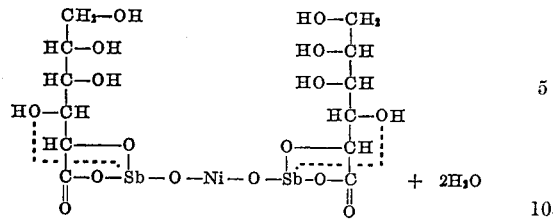

Example 6

Into a hot solution of 20 parts of calcium mannonate in 70 parts of water are introduced 20 parts of antimony trihydroxide and 3 parts of calcium carbonate and the solution heated on a steam bath during 15 minutes. After leaving it to stay over night, it is centrifugated, eventually cleared by filtration and treated with methyl alcohol, whereby the new compound is precipitated. 28 parts of a white, easily soluble powder containing 26% of Sb are obtained in this manner. The theoretical content for the formula $$(C_6H_{10}O_7SbO)_2 Ca+2H_2O$$

would be of 32.9% of Sb.

Its probable constitution is the following:

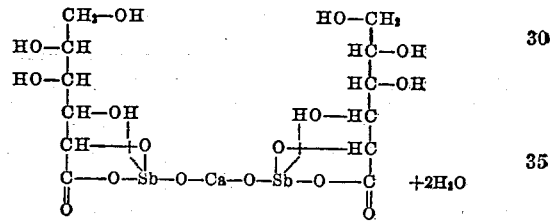

Example 7

10 parts of calciumlactobionate are dissolved in a small quantity of water and treated with 50 parts of a n-ammoniumhydroxide solution. The solution thus obtained is then treated with carbon dioxide until the produced calcium carbonate precipitates in a filterable powder form. After the filtration the solution is concentrated in vacuo up to 20 parts and shaked with 10 parts of antimony trihydroxide. After 24 hours it is filtered again and treated with methyl alcohol, whereby 12.7 parts of a white powder containing 38.3% of Sb and 2.0% N are obtained. The theoretical content for the formula $(C_{12}H_{17}O_{13}Sb_2)$ $NH_4$+$H_2O$ would be of 37.5% of Sb and 2.1% of N.

Its probable constitution is the following:

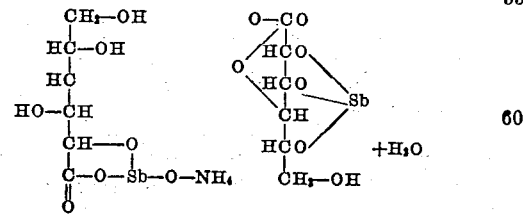

What I claim is:—

1. A process for the preparation of an organic antimony compound yielding with water clear and stable solutions, consisting in dissolving antimony oxyhydrate in aqueous solutions of a polyvalent metal salt of a polyhydroxy-monocarboxylic acid derived from aldoses.

2. A process for the preparation of an organic antimony compound yielding with water clear and stable solutions, consisting in dissolving antimony oxyhydrate in aqueous solutions of a polyvalent metal salt of gluconic acid.

3. A process for the preparation of an organic antimony compound yielding with water clear and stable solutions, consisting in dissolving antimony oxyhydrate in an aqueous solution of calcium gluconate.

4. A polyvalent metal salt of antimonyl polyhydroxymonocarboxylic acid, which is soluble in water, but insoluble in methanol and which yields, when being treated with hydrogen sulphide, a precipitation of an antimony sulphide.

5. A polyvalent metal salt of antimonyl gluconic acid which is soluble in water, but insoluble in methanol and which yields, when being treated with hydrogen sulphide, a precipitation of an antimony sulphide.

6. The calciumantimonyl gluconate which constitutes in dry state a colorless crystalline powder, soluble in water, yielding stable solutions, but insoluble in methanol, yielding with hydrogen sulphide a precipitation of an antimony sulphide and which contains about 32 per cent of antimony.

WALTER KUSSMAUL.

Certificate of Correction

February 18, 1936.

Patent No 2,031,268.

WALTER KUSSMAUL

It is hereby certified that errors appear in the printed specification of the above numbered patent requiring correction as follows: Page 1, second column, line 39, for "glucinate" read *gluconate*; page 2, second column, lines 56 to 64 inclusive, strike out the formula and insert instead the following:

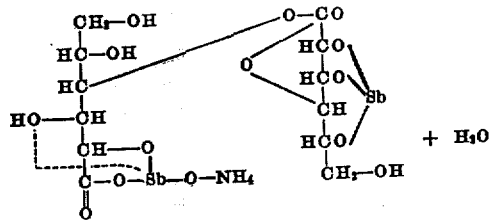

and that the said Letters Patent should be read with these corrections therein that the same may conform to the record of the case in the Patent Office.

Signed and sealed this 29th day of September, A. D. 1936.

[SEAL]

HENRY VAN ARSDALE,
Acting Commissioner of Patents.